United States Patent
Kismartoni et al.

(10) Patent No.: US 10,789,048 B2
(45) Date of Patent: Sep. 29, 2020

(54) NAMESPACE AND CLASS UTILITIES FOR MANAGED PACKAGES

(71) Applicant: salesforce.com, inc., San Francisco, CA (US)

(72) Inventors: Leslie C. Kismartoni, Sarasota, FL (US); Thomas Jones, Alpharetta, GA (US)

(73) Assignee: salesforce.com, inc., San Francisco, CA (US)

(*) Notice: Subject to any disclaimer, the term of this patent is extended or adjusted under 35 U.S.C. 154(b) by 66 days.

(21) Appl. No.: 16/262,783

(22) Filed: Jan. 30, 2019

(65) Prior Publication Data

US 2020/0241846 A1   Jul. 30, 2020

(51) Int. Cl.
G06F 9/44    (2018.01)
G06F 8/30    (2018.01)
G06F 11/36   (2006.01)

(52) U.S. Cl.
CPC .......... G06F 8/30 (2013.01); G06F 11/3684 (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,085,198 A * | 7/2000 | Skinner | G06F 8/315 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |

(Continued)

Primary Examiner — Anna C Deng
(74) Attorney, Agent, or Firm — Jaffery Watson Mendonsa & Hamilton LLP

(57) ABSTRACT

Embodiments regard namespace and class utilities for managed packages. An embodiment of one or more storage mediums include instructions for performing processing in a managed package; processing a call to a namespace utility for a class in the managed package; and, in response to the call to the namespace utility, identifying a namespace for the class, and returning the identified namespace. An embodiment of one or more storage mediums include instructions for performing processing in a managed package; receiving a request from outside the managed package for instantiation of a class, the request including a class instantiation utility; and, in response to the request, delegating instantiation of the class to a factory, and instantiating the class as a public, non-global class.

14 Claims, 12 Drawing Sheets

(56) References Cited

U.S. PATENT DOCUMENTS

| | | |
|---|---|---|
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,330,825 B2 * | 2/2008 | Sakai .................... G06F 9/4411 705/16 |
| 7,340,411 B2 | 3/2008 | Cook |
| 7,451,432 B2 * | 11/2008 | Shukla .................... G06F 8/36 717/106 |
| 7,620,655 B2 | 11/2009 | Larsson et al. |
| 7,853,605 B2 * | 12/2010 | Jones .................... G06F 16/972 707/763 |
| 9,519,879 B1 * | 12/2016 | Subramani ....... G06Q 10/06316 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0204481 A1 * | 10/2003 | Lau .......................... G06F 8/34 |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 * | 9/2004 | Catahan, Jr. ......... G06Q 10/087 705/28 |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2007/0288622 A1 * | 12/2007 | Bodin .................. H04L 41/0816 709/223 |
| 2009/0177744 A1 | 7/2009 | Marlow et al. |
| 2009/0300578 A1 * | 12/2009 | Neil ........................ G06F 9/451 717/104 |
| 2011/0258595 A1 * | 10/2011 | Clevenger ................ G06F 8/40 717/106 |
| 2016/0070567 A1 * | 3/2016 | Furtwangler ........... G06F 8/315 717/122 |
| 2016/0274869 A1 * | 9/2016 | Wolf ........................ G06F 8/30 |
| 2018/0285426 A1 * | 10/2018 | Chow .................... G06F 16/248 |
| 2018/0307505 A1 * | 10/2018 | Santiago .................. G06F 8/30 |

* cited by examiner

```
public with sharing class utilNS {
    private static String ns = null;
    private static String nsDot = null;
    private static String nsBar = null;

// This is a static initializer. The code will reference itself to find its fully
qualified API name and process.
    static {
        ns =
utilNS.class.getName().substringBefore('utilNS').substringBefore('.');
        if (String.isEmpty(ns)){
            ns='';
            nsDot='';
            nsBar='';
        }else{
            nsDot=ns+'.';
            nsBar=ns+'__';
        }
    }

// Returns just the namespace
    public static String getNS(){
        return ns;
    }

// Returns the namespace as "ns__"
    public static String getNSBar(){
        return nsBar;
    }

// Returns the namespace as "ns."
    public static String getNSDot(){
        return nsDot;
    }

// Prepend "ns." to any string. Useful for class definitions.
    public static String appendNSDot(String inp){
        return utilNS.getNSDot()+inp;
    }

// Prepend "ns__" to any string. Useful for sObject fields.
    public static String appendNSBar(String inp){
        return utilNS.getNSbar()+inp;
    }
}
```

FIG. 3

```
// Globally available Instantiator class that delegates instantiation to the
factory it is passed.
global with sharing class utilInstantiator {
    // Globally available class generator. Pass a classname and factory
and the factory will generate the class for the caller.
    global static utilNew(final String classname, utilFactory factory) {
        return factory.createObj(classname);
    }
}

// Globally available extension point.
// Package extensions should create their own version by extending this
version.
    global virtual class utilFactory {
// createObj instantiates the object by name.
    global virtual Object createObj(final String classname){
        return System.type.forName(baseNS, classname).newInstance();
    }
}
```

FIG. 6A

```
// Extend the utilFactory and override the createObj method.
// This is necessary since the type expected by the Instantiator is a
utilFactory.
global class utilFactory extends baseNS.utilFactory {

// It is necessary to override the
    global override Object createObj(final String classname){
        return System.type.forName(extensionNS,
classname).newInstance();
    }
} public class base{
    public String message = 'MESSAGE';
    public String getMessage() {
        return message;
    }
}
```

FIG. 6B

NAMESPACE AND CLASS UTILITIES FOR MANAGED PACKAGES

TECHNICAL FIELD

Embodiments relate to techniques for computer operations. More particularly, embodiments relate to namespace and class utilities for managed packages.

BACKGROUND

In the development of computer applications, a package is a container to contain or include one or more components. In particular, a package may include elements created by a developer. After creating a package, an initial developer may intend to distribute the package to others, such as developers who intend to install and use the package as clients. A package may be either an unmanaged package, which is commonly used for distributing open source projects or templates, or a managed package, which is typically used to distribute and sell applications to customers. A managed package generally does not allow a recipient client to modify the package files. Further, not all files are exposed to the client—in general only files that are marked as "global" have function signatures that are exposed to the client. A developer may utilize a managed package to sell and manage user-based licenses to an application.

However, certain operations within a managed package may be controlled or limited, including operations with regard to namespaces and classes. When developing software in a managed package, wherein the managed package may be a base package or an extension to a base package, it is often necessary to refer to the namespace associated with the managed package in some dynamic fashion. For example, package developers may develop code directly in a pre-package environment without a namespace, while testing and deploying the package to environments in which a predetermined package namespace is used.

Further, inside of managed packages there are limitations on how classes may be instantiated. For example, in general, only globally scoped classes may be instantiated by clients of the package. This includes managed package extensions built on top of the base managed package namespace.

BRIEF DESCRIPTION OF THE DRAWINGS

Embodiments are illustrated by way of example, and not by way of limitation, in the figures of the accompanying drawings in which like reference numerals refer to similar elements.

FIG. 3 is an illustration of a class definition for a namespace utility in an apparatus or system according to one or more embodiments;

FIG. 6A is an illustration of class definitions for a class instantiation utility according to one or more embodiments;

FIG. 6*b* is an illustration of extension of a factory utility for a class instantiation utility according to one or more embodiments;

DETAILED DESCRIPTION

Figure 1:
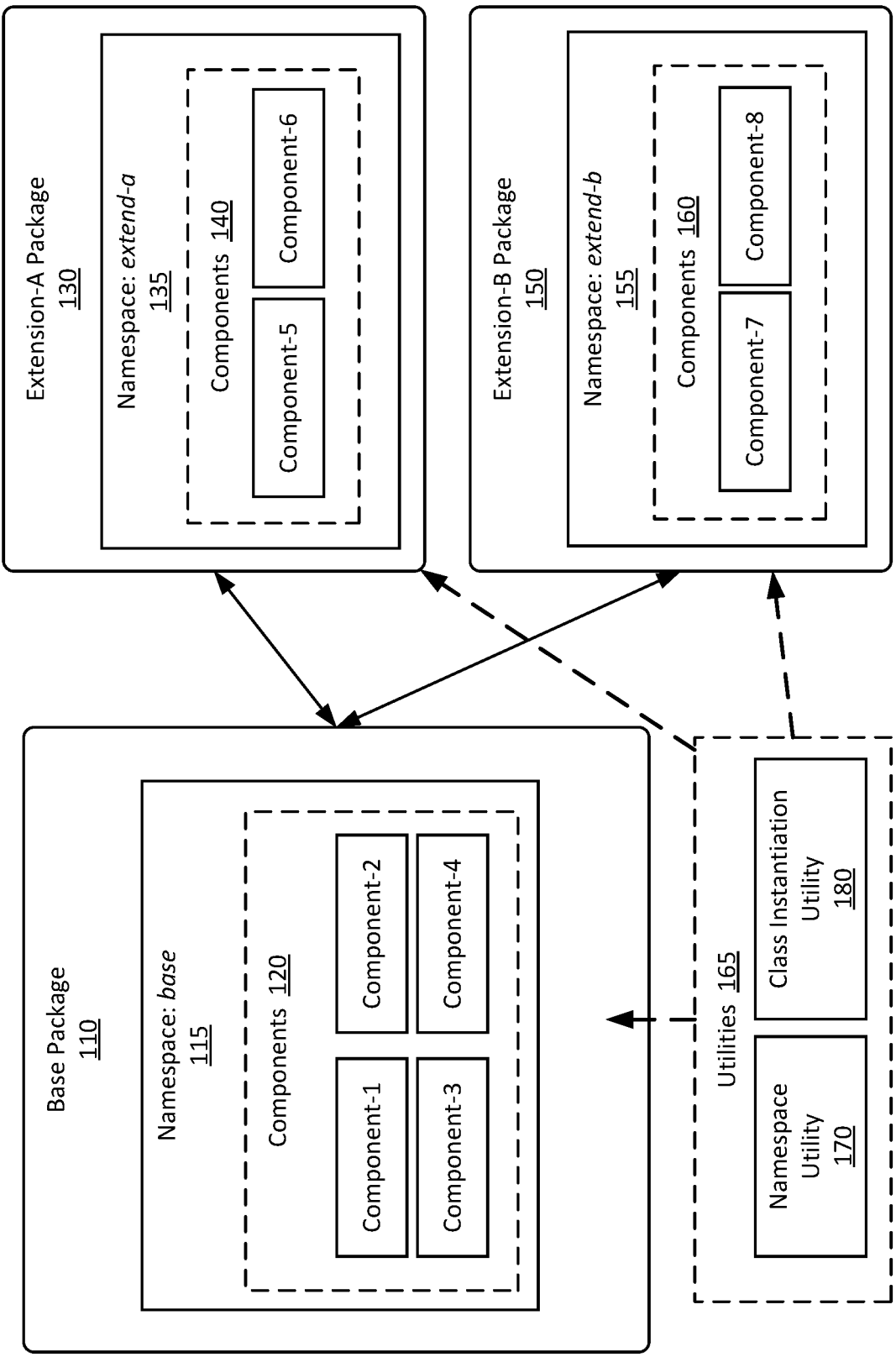
FIG. 1 is an illustration of a managed base package and extension packages according to one or more embodiments.

In the following description, numerous specific details are set forth. However, embodiments may be practiced without these specific details. In other instances, well-known circuits, structures and techniques have not been shown in detail in order not to obscure the understanding of this description.

In some embodiments, an apparatus, system, or process is to provide for namespace and class utilities for managed packages.

In the development of coding for a managed base package with one or more extension packages, the base package and each extension package including a separate namespace, there may be circumstances in which there are limitations regarding the namespaces and the generation of classes within such namespaces. In general, a namespace is a set of symbols that are used to organize objects of various kinds, so that these objects may be referred to by name. Every component is part of a certain namespace, with the proper namespace being used to access the components of that namespace. The generation of coding may include, but is not limited to, coding utilizing Apex of Salesforce, Inc., Apex being a strongly typed, object-oriented programming language that allows developers to execute flow and transaction control statements on Salesforce servers in conjunction with calls to the API (Application Programming Interface). Apex is a development platform for building software as a service (SaaS) applications on top of customer relationship management (CRM) functionality.

When developing applications in a managed package, which may be a base package or a package extension, it may be necessary to refer to the namespace associated with the managed package in some dynamic fashion. For example, developers may develop code directly versus testing in a QA (Quality Assurance) environment where a temporary QA namespace might be used versus a production environment where the package names might be necessary. However, identification of which namespace will apply in a particular instance may be extremely difficult during the development of the coding.

Further, there may be limitations on the instantiation of classes within each of the namespaces in a managed package. Inside of managed packages, there are limitations on how classes are instantiated using the System.type.forName (namespace, classname).newInstance( ) convention. For example, only globally scoped classes can be instantiated from outside of the package. This includes managed package extensions built on top of the base managed package namespace. This may be problematic as there are several limitations on global classes and methods, most notably that they cannot be removed. In summary, inside a managed packaged any class can generally be instantiated as necessary. However, outside of the managed package this is not true, and clients of the package will have their actions/scope limited by the protections that the managed package provides for the original developer.

In some embodiments, an apparatus, system, or process includes either or both of the following:

(1) A namespace utility to return the applicable namespace that is running, and thus enable a developer to develop code that provides dynamic namespace identification.

(2) A class instantiation utility to enable the instantiation of a class within a managed package wherein the instantiation is initiated from outside the managed package.

FIG. 1 is an illustration of a managed base package and extension packages according to one or more embodiments. A managed package such as base package 110 may include classes that are extensions to the managed package. For example, there may be a main package requiring a main license, with the main package including components (main package components) that allow a set of functions. The developer may further develop a first extension to the main package having a first set of components enabling a first set of extended functions, and a second extension to the main package with a second set of components enabling a second set of extended functions. In this example, the developer may choose to provide each of the additional extensions with the payment for an additional license.

As illustrated in FIG. 1, the base package 110 is a managed package, which may include, but is not limited to, a package generated utilizing Apex of Salesforce, Inc. as developed by a particular developer. The base package 110 includes a base namespace 115, and may include multiple components 120, illustrated as, for example, component-1, component-2, component-3, and component-4, wherein the components may provide multiple functions. As illustrated, the base package 110 includes one or more managed extension packages (which may also be referred to as extensions), which are illustrated as an extension-A package 130 and an extension-B package 150. In this example, a client may license the base package, and then may optionally license one or more of the extension packages to operate with the base package. In this example, extension-A 130 includes a namespace, shown as namespace extend-a 135, which may contain one or more components 140, shown as component-5 and component-6, and extension-B 150 includes a namespace, shown as namespace extend-b 155, which may contain one or more components 160, shown as component-7 and component-8.

In some embodiments, an apparatus, system, or process includes one or more namespace and class utilities 165 for managed packages, wherein the utilities may include one or both of a namespace utility 170 and a class instantiation utility 180. The utilities 170 and 180 may be established in the base package 110 and in one or more of the extension packages 130 and 150. The utilities 165 may operate separately or in conjunction with each other, depending on the circumstances of a managed package.

Figure 2:
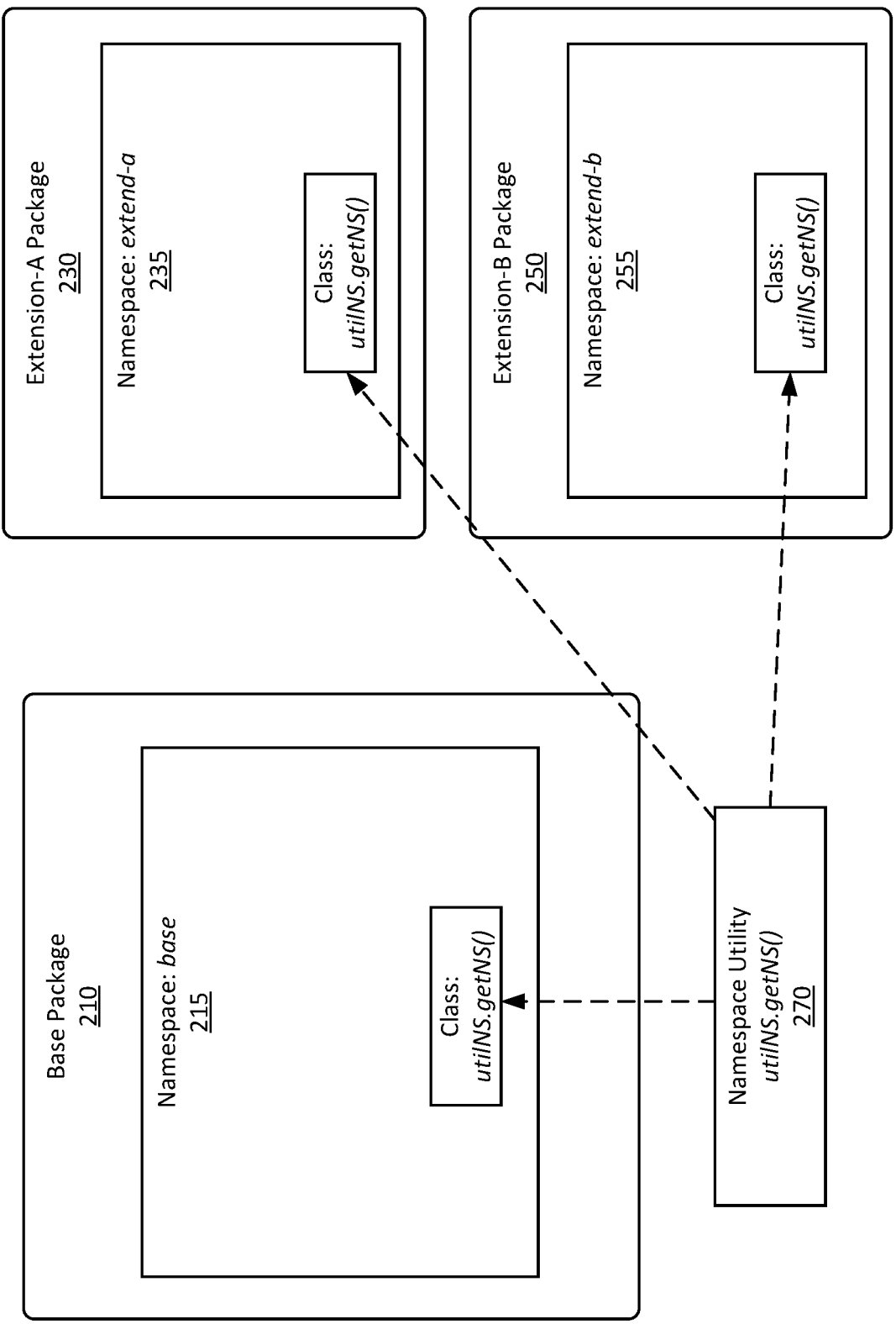
FIG. 2 illustrates a namespace utility in an apparatus or system according to one or more embodiments.
Figure 4:
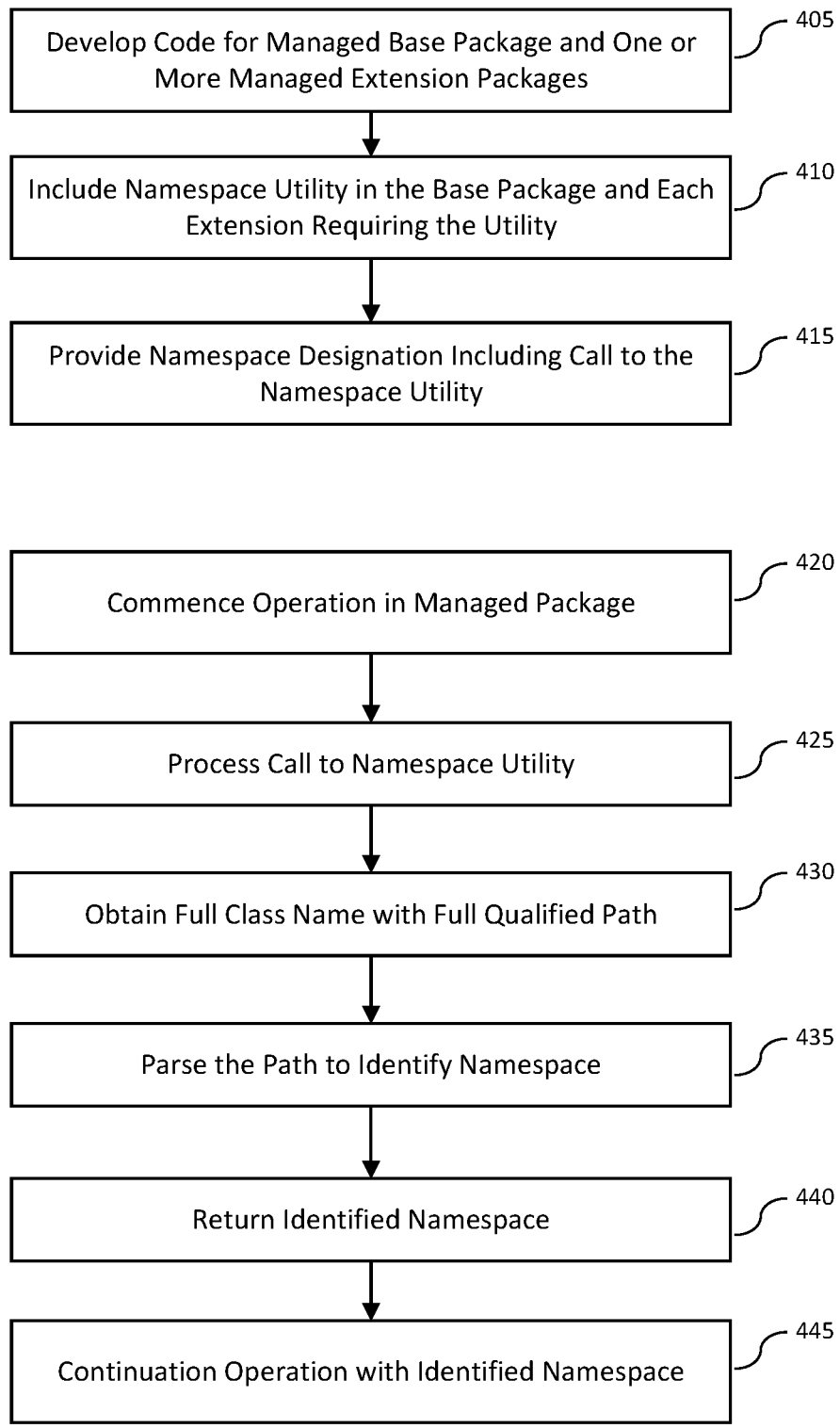
FIG. 4 is a flowchart to illustrate processes for use and operation of a namespace utility according to one or more embodiments.

In some embodiments, the namespace utility 170, which is illustrated in more detail in FIGS. 2, 3, and 4, allows for reference to a namespace associated with the managed package in a dynamic manner, the namespace utility 170 to return the name of the current associated namespace for an element.

As described above, it may be very difficult to identify the applicable namespace when the code for the managed package is developed. Examples of specific usages of the namespace utility 170 may include, but are not limited to, the following cases in Apex:

(a) Providing URL (Uniform Resource Locator) references across package boundaries.

(b) References to fields of an object (including sObject fields in Apex, or other types of objects) using a dynamic function to include a varying namespace.

(c) Creating test data via JSON (JavaScript Object Notation) calls, which may include field names that require namespace references.

In some embodiments, class instantiation utility 180, which is illustrated in more detail in FIGS. 5A, 5B, 6A, 6B, and 7, enables the instantiation of a class from outside a namespace, rather than requiring the generation of a globally scoped class.

In some embodiments, the class instantiation utility 180 is to delegate class instantiation to a base managed-package "class instantiator" that takes as input a package-based "class factory" and a package-based class name as a string and provides for extension of the class instantiation from the base package into an extension package. A factory in object-oriented programming is an object for creating other objects, and specifically a class factory is an object to generate a class.

FIG. 2 illustrates a namespace utility in an apparatus or system according to one or more embodiments. In a particular example, a base package 210 includes a base namespace 215, and may include one or more extension packages, which are illustrated as an extension-A package 230 with extend-a namespace 235 and an extension-B package 250 with extend-b namespace 255.

In some embodiments, an apparatus, system, or process provides a namespace utility 270, wherein the utility is designated as utilNS.getNS( ). The namespace utility 270 specifies a class that returns the namespace of the package it is associated with. For example, for code that lives inside the base package 210, the name "base" will implicitly apply the namespace "base". Thus, calling utilNS.getNS( ) will implicitly call base.utilNS.getNS( ).

As illustrated in FIG. 2, there are extension packages 230 and 250 with the namespaces "extend-a" and "extend-b" that extend the "base" package. Each of these extensions also supplies a utilNS class. In some embodiments, within the extend-a template, calling utilNS.getNS( ) will implicitly call extend-a.utilNS.getNS( ) due to scoping rules. Calling base.UtilNS.getNS( ) will call the utility from the underlying package.

In some embodiments, the namespace utility will operate by obtaining the full name for the applicable class, the full name of the class including the full qualified path with the namespace. In some embodiments, the namespace utility will parse the path for the class to identify the namespace, and then return the identified namespace.

The namespace utility may be applied in multiple different circumstances, including, but not limited to, the following examples:

Example 1: Using utilNS to Find Object Field Names

In a first example, it may be assumed that a developer is developing code in an unpackaged environment where there is no namespace, but the developer is aware that the code will be submitted as part of a package that will need to make reference to the namespace. This circumstance often occurs when, for example, the developer is attempting to examine object field names (such as sObject field names in Apex) that will conditionally include the namespace depending on if the field names are or are not packaged. It is noted that the sObject class contains methods for the sObject data type. SObject methods are all instance methods in that they are called by and operate on an sObject instance, such as, for example, an account or contact.

For example, an sObject may return "LongDesc_c" as a field. If unmanaged, then a caller can refer to the field by that string directly. However, if the code is part of a managed package, such as with the namespace "base", then "base_LongDesc_c" is the correct form for referring to the field.

In some embodiments, the namespace utility enables a developer to reference a field without regard to the environment, using a mechanism such as the following:

String descriptionValue=mySObject(ccUtilNS.appendNSBar('LongDescRT_c'));

Example 2: Using utilNS to Create sObject Field Names

In a second example, it is again assumed that a developer is working in an unpackaged environment in which there is no namespace but is aware that the code will be submitted as part of a package that will be required to reference the namespace.

In some embodiments, if the developer is creating test data, then the developer may apply the utilNS when generating fields that will have the correct namespacing, such as following

```
// Generate test Category data.
new Map<String,Object>{
  'name'=>'testCategory100fr',
  ccUtilNS.appendNSBar('dataId_c')
    =>'testCategory100fr',
  ccUtilNS.appendNSBar('Locale_c')=>'fr',
  ccUtilNS.appendNSBar('LongDesc_c')=>'fr'+ccApiTestData.DEFAULT_LONGDESC,
  ccUtilNS.appendNSBar('SEOId_c')=>'fr'+ccApiTestData.DEFAULT_SEOID+'100',
  ccUtilNS.appendNSBar('ShortDescRT_c')=>'fr'+ccApiTestData.DEFAULT_SHORTDESC,
  ccUtilNS.appendNSBar('Category_r')=>new E_Category_c(dataId_c='testCategory100')
}
```

The above structure can then be deserialized into an sObject using the JSON (JavaScript Object Notation) system calls.

FIG. 3 is an illustration of a class definition for a namespace utility in an apparatus or system according to one or more embodiments. The namespace utility may be a utility as illustrated in FIG. 2 and operating as illustrated in FIG. 4. The class is to be defined in each package that is to utilize the namespace utility.

FIG. 4 is a flowchart to illustrate processes for use and operation of a namespace utility according to one or more embodiments. As illustrated in FIG. 4, a process includes developing code for a managed base package and one or more managed extension packages 405, which may include, for example, base package 210 and one or more of extension-A package 230 and extension-B package 250 illustrated in FIG. 2. The process further includes providing a namespace utility in the base package and each extension package requiring the utility 410. The inclusion of the namespace utility enables the designation of a namespace including a call to the namespace utility 415.

In some embodiments, a process may include commencing operation in a managed package 420. The operation may include processing a call to the namespace utility 425. Upon receipt of the call to namespace utility, the full class name with full qualified path is obtained 430, and the path is parsed to identify the namespace 435. The identified namespace is returned 440. The operation may then continue, utilizing the identified namespace 445.

Figure 5A:
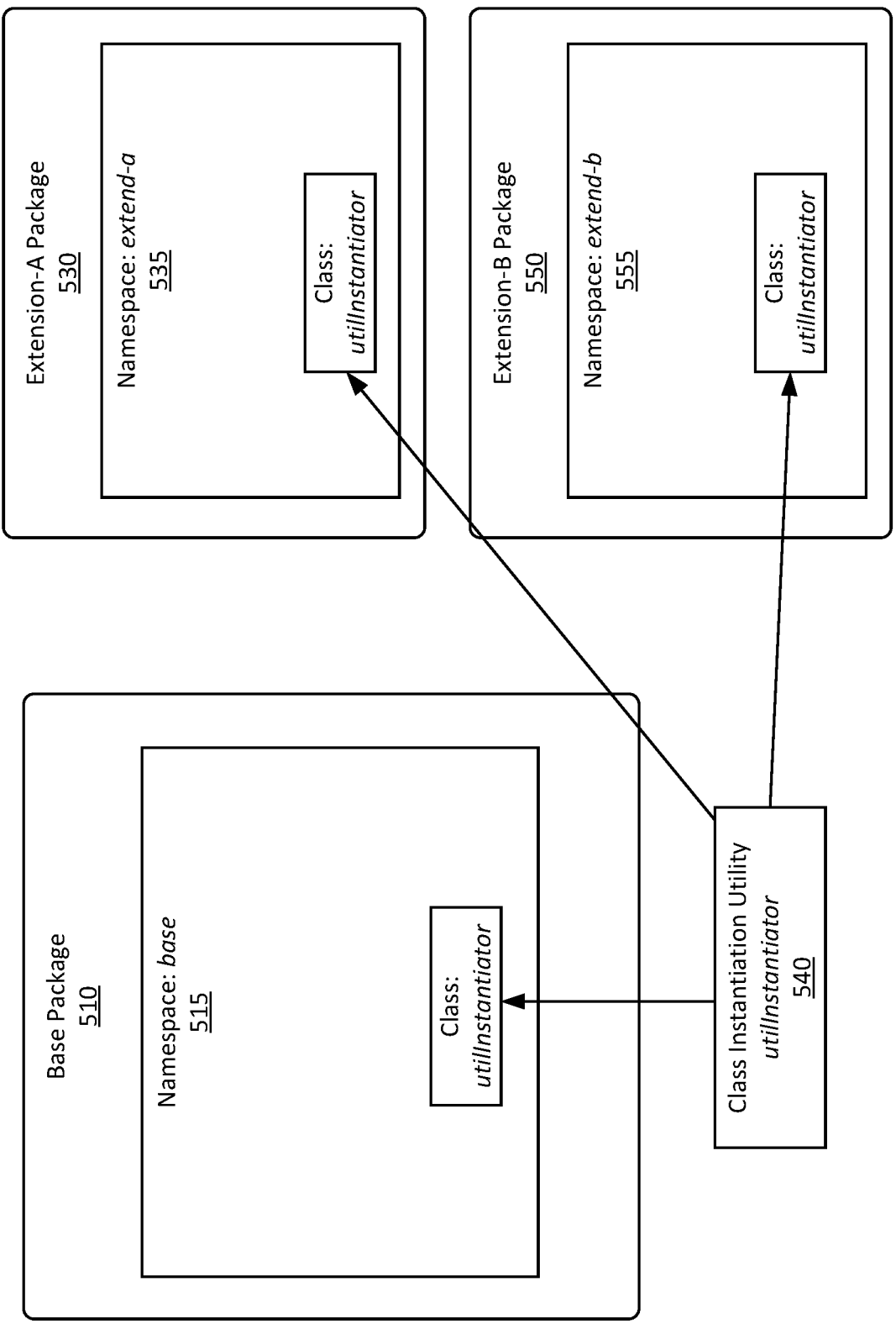
FIG. 5A is an illustration of an apparatus or system to perform class instantiation outside of a managed package according to one or more embodiments.

FIG. 5A is an illustration of an apparatus or system to perform class instantiation outside of a managed package according to one or more embodiments. As illustrated in FIG. 5A, in a particular example a base package 510 includes a namespace base 515, and may include one or more extension packages, which are illustrated as an extension-A package 530 with namespace extend-a 535 and an extension-B package 550 with namespace extend-b 555.

In some embodiments, an apparatus, system, or process provides a class instantiation utility 540, wherein the utility is designated as utilInstantiator. The instantiation utility 540 specifies a class that enables a class instantiation that is initiated from outside of a managed package without requiring the use of a global access modifier, as further illustrated in FIG. 5B.

Figure 5B:
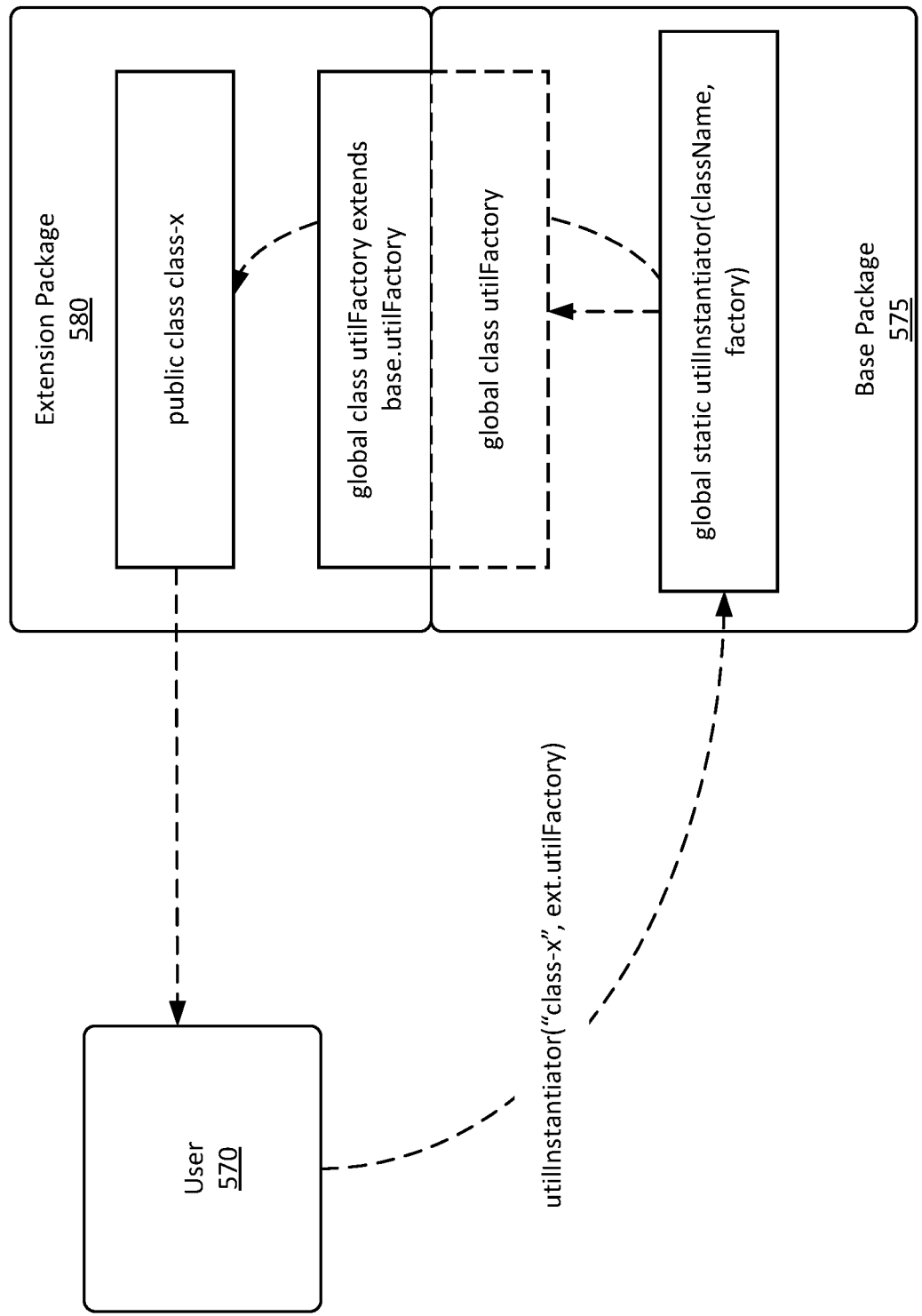
FIG. 5B is an illustration of class instantiation outside of a managed package utilizing a class instantiation utility according to one or more embodiments.

FIG. 5B is an illustration of class instantiation outside of a managed package utilizing a class instantiation utility according to one or more embodiments. As illustrated in FIG. 5B, a user 570 wishes to instantiate a particular class in a managed extension package 580 of a base package 575. As illustrated, in order to perform the class instantiation, the user is to direct a call to a class instantiation utility utilInstantiator together with input including the requested class name, "class-x" in this example, and a package-based factory to generate the class.

In some embodiments, the base namespace includes a global static class for the class instantiation utility, shown as utilInstantiator(className,factory) in base package 575. Upon receipt of the call to the utility, the utility is to generate a global class factory, utilFactory, which extends the base class factory, base.utilFactory, in the extension package. In this manner, the instantiator delegates class creation to the factory class. The global class utilFactory then is operable to instantiate the requested class, public class class-x, and return the instantiated class for the user 570.

In FIG. 5B, the class to be instantiated is "class-x". The instantiator is defined in the base package 575 while the "factory" and the class needing instantiation ("class-x" in FIG. 5B) are defined in the relevant extension package 580.

It is noted that that "class-x" is publicly scoped. The global scoping of "factory" indicates that the factory defined in the extension is available outside of the package, thus allowing outside callers to instantiate packaged classes that are marked public, i.e. creation requests can originate outside of the managed package structure.

Figure 7:
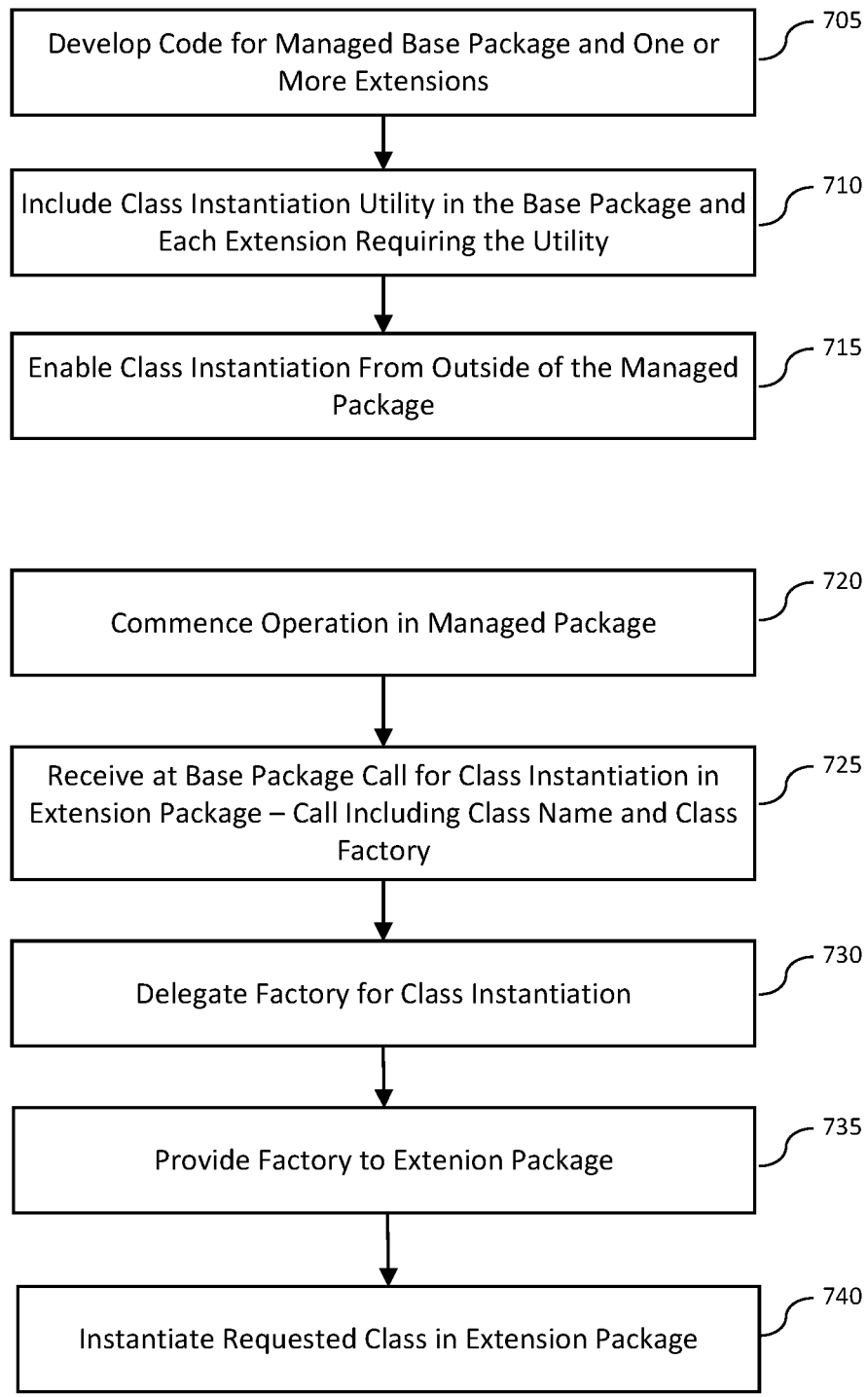
FIG. 7 is a flowchart to illustrate processes for use and operation of a class instantiation utility according to one or more embodiments.

FIG. 6A is an illustration of class definitions for a class instantiation utility according to one or more embodiments. The class instantiation utility may be a utility as illustrated in FIGS. 5A and 5B and operating as illustrated in FIG. 7. As illustrated, the class definitions include definition of a globally available instantiator class that delegates instantiation to the factory it is passed, and globally available extension point for package extensions.

FIG. 6B is an illustration of extension of a factory utility for a class instantiation utility according to one or more embodiments. As illustrated, the factory utility utilFactory extends the base factory contained in the base namespace.

Further, create object method createObj is overridden for purposes of the class instantiation utility.

FIG. 7 is a flowchart to illustrate processes for use and operation of a class instantiation utility according to one or more embodiments. As illustrated in FIG. 7, a process includes developing code for a managed base package and one or more extension packages 705, which may include, for example, base package 510 and one or more of extension-A package 530 and extension-B package 550 illustrated in FIG. 5. The process further includes providing a class instantiation utility in the base package and each extension package requiring the utility 710. The inclusion of the class instantiation utility enables the instantiation of a class in an extension package in response to call to the class instantiation utility 715.

In some embodiments, a process may include commencing operation in a managed package 720. The operation may include receiving a call to the class instantiation utility from outside the managed package, the call including the requested class name and the class factory for the class 725. Upon receipt of the call to the class instantiation utility, the class instantiation delegates instantiation function to the factory the class instantiation utility is passed 730, and the factory is provided to the extension package 735. The requested class is then instantiated in the extension package 740.

The examples illustrating the use of technology disclosed herein should not be taken as limiting or preferred. The examples are intended to sufficiently illustrate the technology disclosed without being overly complicated and are not intended to illustrate all of the technologies disclosed. A person having ordinary skill in the art will appreciate that there are many potential applications for one or more implementations of this disclosure and hence, the implementations disclosed herein are not intended to limit this disclosure in any fashion.

One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

Other implementations may include a non-transitory computer readable storage medium storing instructions executable by a processor to perform a method as described above. Yet another implementation may include a system including memory and one or more processors operable to execute instructions, stored in the memory, to perform a method as described above.

Implementations may include:

In some embodiments, one or more non-transitory computer-readable storage mediums have stored thereon executable computer program instructions that, when executed by one or more processors, cause the one or more processors to perform operations including performing processing in a managed package; processing a call to a namespace utility for a class in the managed package; and, in response to the call to the namespace utility, identifying a namespace for the class, and returning the identified namespace.

In some embodiments, wherein identifying the namespace for the class includes obtaining a full name for the class, the full name for the class including a full qualified path, and parsing the full qualified path to identify the namespace for the class.

In some embodiments, the managed package is a base package or extension package of one or more extension packages of the base package, the base package and each of the one or more extension packages including a separate namespace.

In some embodiments, the class may be located within any of the base package or the one or more extension packages.

In some embodiments, the namespace utility is defined within the base package and within each of the one or more extension packages.

In some embodiments, the call to the namespace utility includes any of the following: providing one or more URL (Uniform Resource Locator) references across package boundaries; references to fields of an object using a dynamic reference to the namespace; and creating test data that include field names that require namespace references.

In some embodiments, one or more non-transitory computer-readable storage mediums have stored thereon executable computer program instructions that, when executed by one or more processors, cause the one or more processors to perform operations including performing processing in a managed package; receiving a request from outside the managed package for instantiation of a class, the request including a class instantiation utility; and, in response to the request, delegating instantiation of the class to a factory, and instantiating the class as a public, non-global class.

In some embodiments, the request includes the factory for generation of the class.

In some embodiments, the managed package includes a base package or an extension package of one or more extension packages of the base package, the managed package and each of the one or more extension packages including a separate namespace.

In some embodiments, the class may be instantiated within any of the base package or the one or more extension packages.

In some embodiments, the class is instantiated within a first extension package of the one or more extension packages, and further including instructions for providing the delegated factory to the first extension package for instantiation of the class in the first extension package.

In some embodiments, the class instantiation utility is defined within the base package and within each of the one or more extension packages.

In some embodiments, a system includes one or more processors; and a memory to store data, including data for one or more managed packages, wherein the system is to provide one or more utilities for managed packages, the one or more utilities including one or more of: a namespace utility, wherein, in response to a call to the namespace utility for a first class in a first managed package, the namespace utility is to identify a namespace for the first class, and return the identified namespace; and a class instantiation utility, wherein, in response to a request from outside the first managed package for instantiation of a second class, the request including the class instantiation utility, the class instantiation utility is to delegate instantiation of the second class to a factory, and instantiate the second class as a public, non-global class.

In some embodiments, the first managed package is a base package or an extension package of one or more extension packages of the base package, the managed package and each of the one or more extension packages including a separate namespace.

In some embodiments, identifying the namespace for the first class includes the namespace utility to obtain a full name for the first class, the full name for the first class including a full qualified path, and parse the full qualified path to identify the namespace for the first class.

In some embodiments, the first class may be located within any of the base package or the one or more extension packages.

In some embodiments, the namespace utility is defined within the base package and within each of the one or more extension packages.

In some embodiments, the call to the namespace utility includes any of the following: providing one or more URL (Uniform Resource Locator) references across package boundaries; references to fields of an object using a dynamic reference to the namespace; and creating test data that include field names that require namespace references.

In some embodiments, the request for instantiation of the second class includes the factory for generation of the second class.

In some embodiments, the second class may be instantiated within any of the base package or the one or more extension packages.

In some embodiments, the second class is instantiated within a first extension package of the one or more extension packages, the class instantiation utility further to provide the delegated factory to the first extension package for instantiation of the second class in the first extension package.

In some embodiments, the class instantiation utility is defined within the base package and within each of the one or more extension packages.

Figure 8:
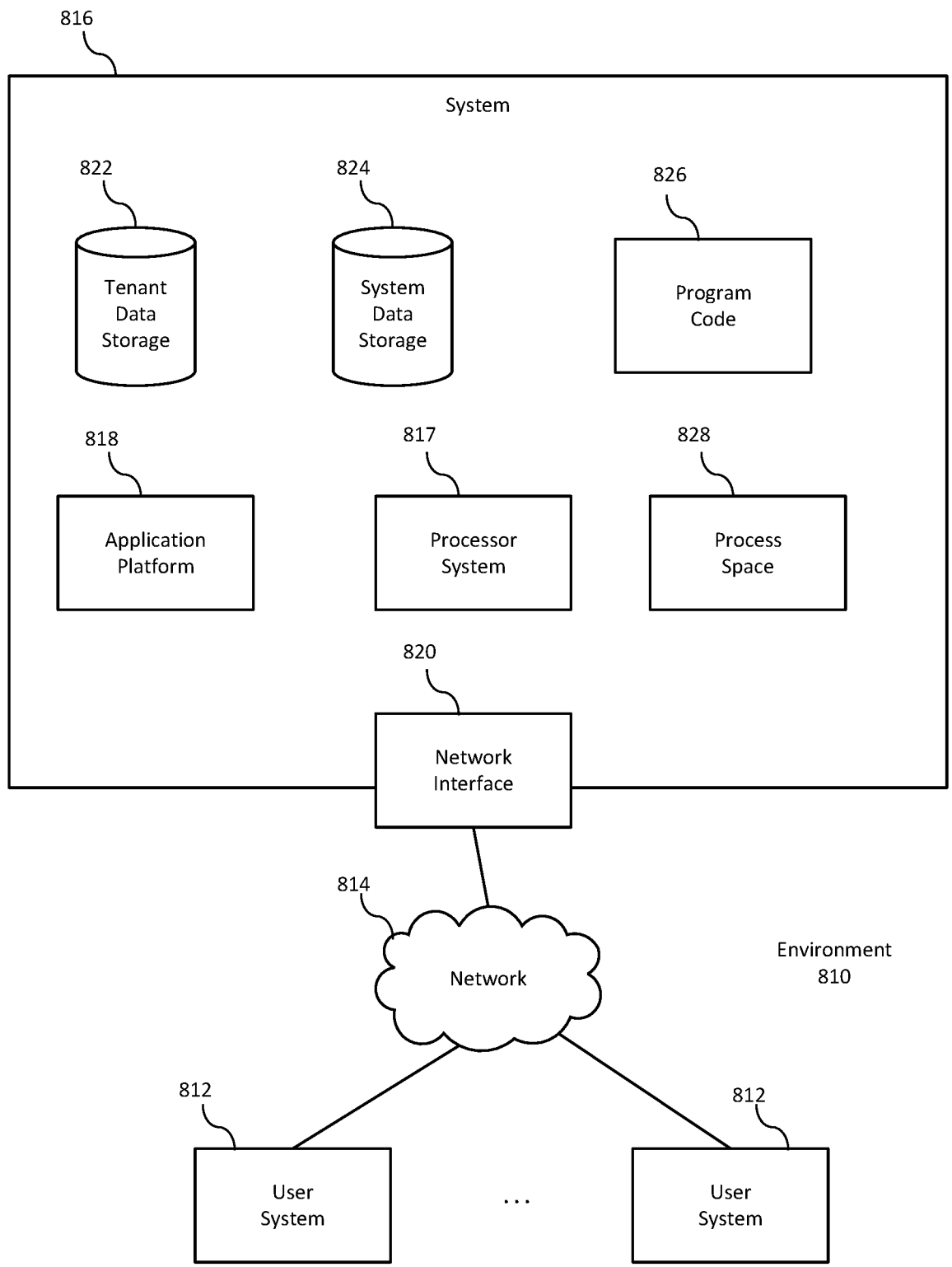
FIG. 8 illustrates a block diagram of an environment in which namespace and class utilities for managed packages may be provided.

FIG. 8 illustrates a block diagram of an environment in which namespace and class utilities for managed packages may be provided. In some embodiments, the environment 810 includes provision of namespace and class utilities for managed packages as illustrated in FIGS. 1-7. The environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a smart phone, a laptop or tablet computer, a work station, and/or a network of computing devices. As illustrated in herein FIG. 8 and in more detail in FIG. 8, user systems 812 may interact via a network 814 with an on-demand database service, such as system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" may be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third-party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third-party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop or tablet computer, smart phone, or any wireless access protocol (WAP) enabled device or any other computing device capable of interfacing directly or indirectly to the Internet or other network connection. User system 812 typically runs an HTTP client, e.g., a browsing program (also referred to as a web browser or browser), such as Edge or Internet Explorer from Microsoft, Safari from Apple, Chrome from Google, Firefox from Mozilla, or a WAP-enabled browser in the case of a smart phone or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, touch pad, touch screen, pen, voice interface, gesture recognition interface, or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Core series processor or the like. Similarly, system 816 (and additional instances of an MTS, where more than one is present) and all of their components might be operator configurable using application(s) including computer code to run using a central processing unit such as processor system 817, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk or solid state drive (SSD), but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline back-ups or other redundancies, etc., and might include a distributed database or storage network and associated processing intelligence.

Figure 9:
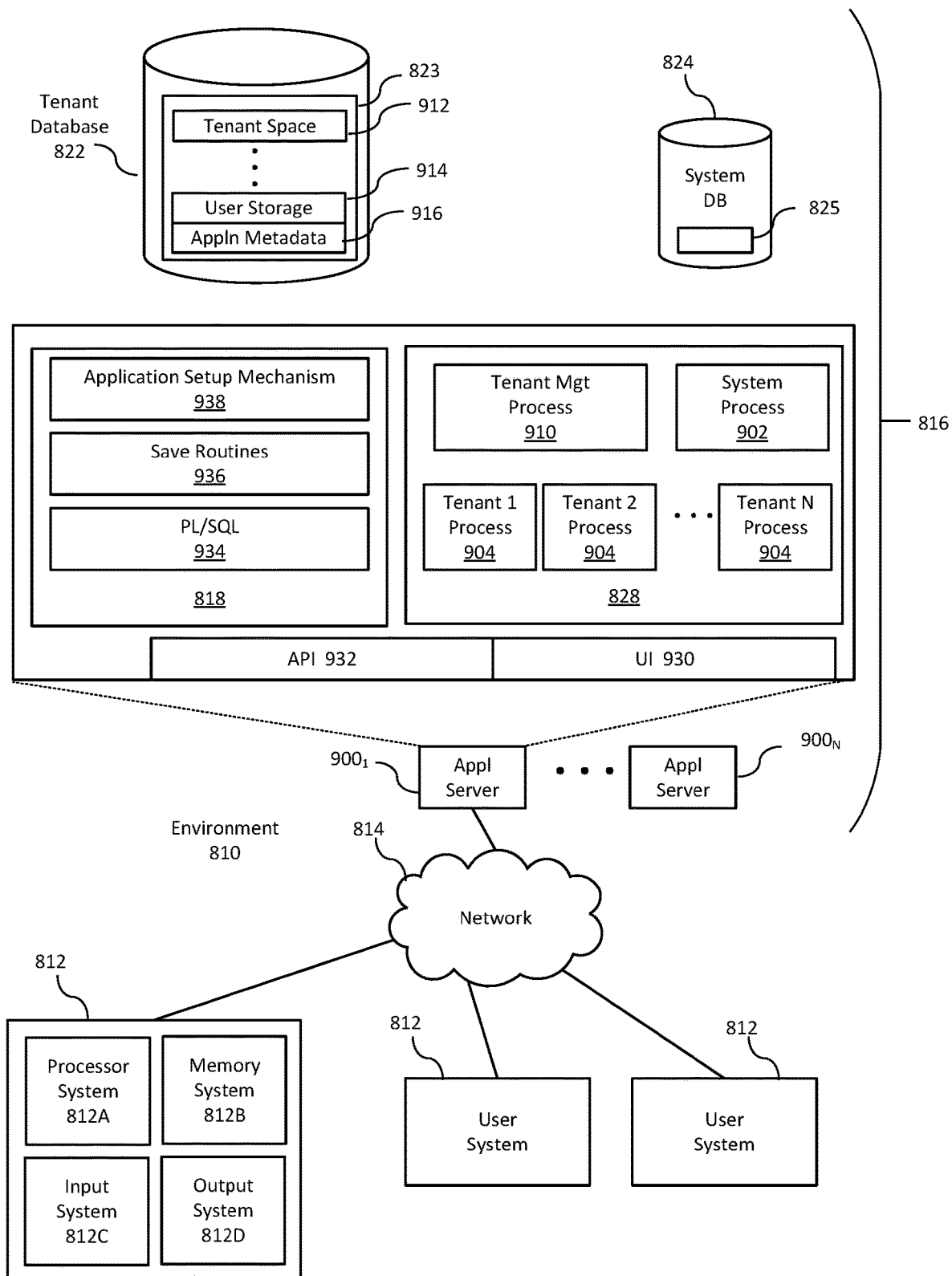
FIG. 9 illustrates further details of an environment in which an on-demand database service may be provided.

FIG. 9 illustrates further details of an environment in which an on-demand database service may be provided. FIG. 9 provides further detail regarding elements of system 816. In addition, various interconnections in an embodiment are provided. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long-term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 BIG-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of an MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, with U.S. Pat. No. 7,779,039, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10:
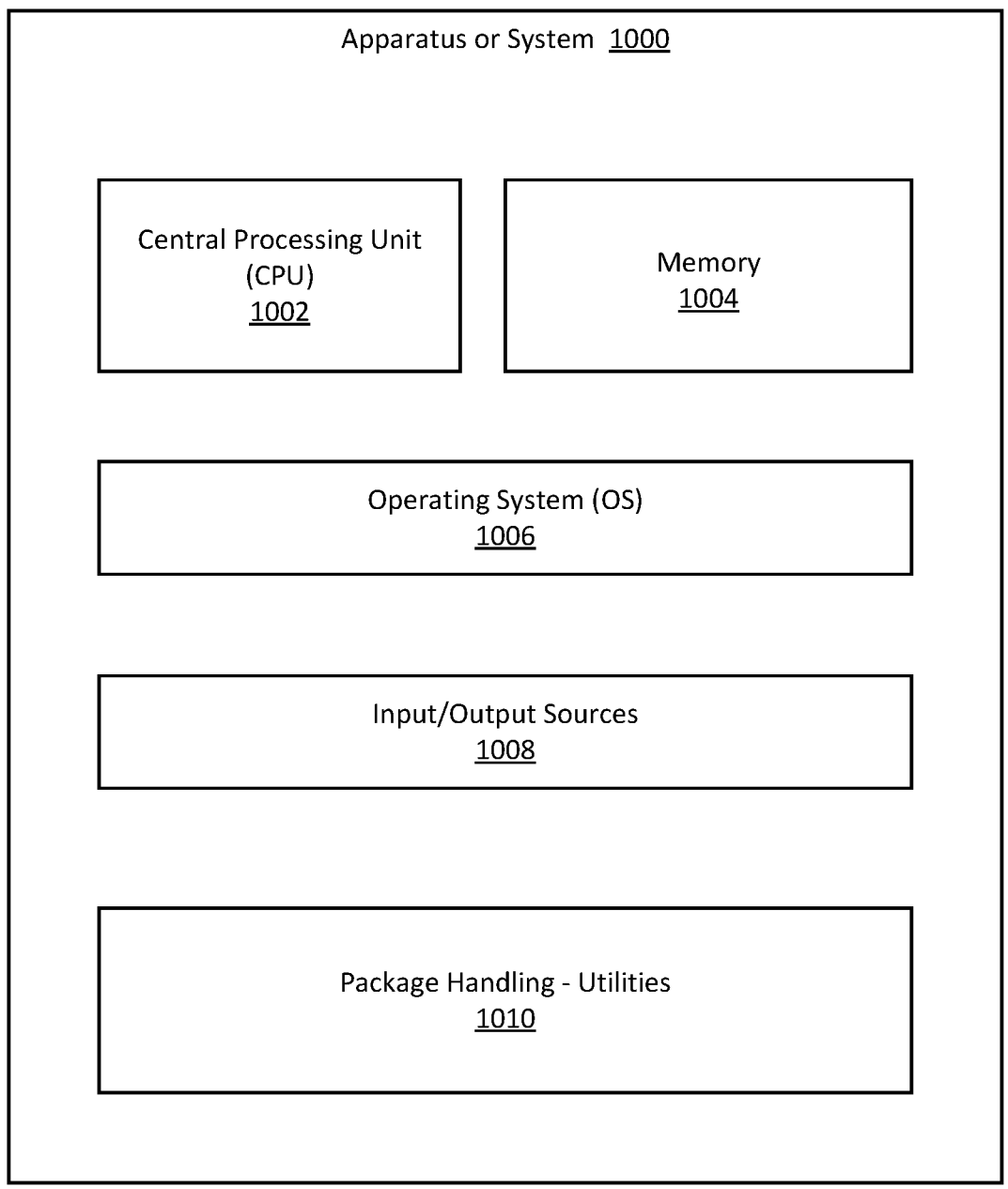
FIG. 10 illustrates an apparatus or system including namespace and class utilities for managed packages according to some embodiments.

FIG. 10 illustrates an apparatus or system including namespace and class utilities for managed packages according to some embodiments. Apparatus or system 1000 represents a communication and data processing device including but not limited to a computer, server, or other apparatus or system.

Further, for example, apparatus or system 1000 may include a computer platform hosting an integrated circuit ("IC"), such as a system on a chip ("SoC" or "SOC"), integrating various hardware and/or software components of apparatus or system 1000 on a single chip.

As illustrated, in one embodiment, apparatus or system 1000 may include, but is not limited to, one or more processors including a central processing unit 1002 ("CPU" or simply "application processor") or other main processing unit, memory 1004, network devices, drivers, or the like, as well as input/output (IO) sources 1008, such as touchscreens, touch panels, touch pads, virtual or regular keyboards, virtual or regular mice, ports, connectors, etc. Apparatus or system 1000 may include an operating system (OS) 1006 serving as an interface between hardware and/or physical resources of apparatus or system 1000 and a user.

It is to be appreciated that a lesser or more equipped system than the example described above may be preferred for certain implementations. Therefore, the configuration of apparatus or system 1000 may vary from implementation to implementation depending upon numerous factors, such as price constraints, performance requirements, technological improvements, or other circumstances.

Embodiments may be implemented as any or a combination of: one or more microchips or integrated circuits interconnected using a system board, hardwired logic, software stored by a memory device and executed by a microprocessor, firmware, an application specific integrated circuit (ASIC), and/or a field programmable gate array (FPGA). The terms "logic", "module", "component", "engine", and "mechanism" may include, by way of example, software or hardware and/or a combination thereof, such as firmware.

In one embodiment, package handling 1010, including namespace and class instantiation utilities for managed packages as illustrated in any of FIGS. 1-7, may be hosted by memory 1004 of apparatus or system 1000. In another embodiment, package handling 1010 may be hosted by or be part of operating system 1006 of apparatus or system 1000.

Apparatus or system 1000 may host network interface(s) to provide access to a network, such as a LAN, a wide area network (WAN), a metropolitan area network (MAN), a personal area network (PAN), Bluetooth, a cloud network, a mobile network (e.g., 3rd Generation (3G), 4th Generation (4G), 5th Generation (5G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media (including a non-transitory machine-readable or computer-readable storage medium) having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic tape, magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

While concepts been described in terms of several embodiments, those skilled in the art will recognize that embodiments not limited to the embodiments described but can be practiced with modification and alteration within the spirit and scope of the appended claims. The description is thus to be regarded as illustrative instead of limiting.

What is claimed is:

1. One or more non-transitory computer-readable storage mediums having stored thereon executable computer program instructions that, when executed by one or more processors, cause the one or more processors to perform operations comprising:
   performing processing in a managed package containing one or more software components, wherein the managed package is a base package or an extension package of one or more extension packages of the base package, the base package and each of the one or more extension packages including a separate namespace;
   processing a call to a namespace utility for a class in the managed package, wherein the namespace utility is defined within the base package and each of the one or more extension packages; and
   in response to the call to the namespace utility:
      identifying a namespace for the class, wherein identifying the namespace for the class comprises obtaining a full name for the class, the full name for the class including a full qualified path, and parsing the full qualified path to identify the namespace for the class, and
      returning the identified namespace.

2. The one or more storage mediums of claim 1, wherein the class may be located within any of the base package or the one or more extension packages.

3. The one or more storage mediums of claim 1, wherein the call to the namespace utility includes any of the following:
   providing one or more URL (Uniform Resource Locator) references across package boundaries;
   providing references to fields of an object using a dynamic reference to the namespace; and
   creating test data that include field names that require namespace references.

4. One or more non-transitory computer-readable storage mediums having stored thereon executable computer program instructions that, when executed by one or more processors, cause the one or more processors to perform operations comprising:
   performing processing in a managed package containing one or more software components, wherein the managed package is a base package or an extension package of one or more extension packages of the base package, and a class instantiation utility is defined within the base package and each of the one or more extension packages;
   receiving a request from outside the managed package for instantiation of a class, the request including the class instantiation utility and a factory for generation of the class; and
   in response to the request:
      delegating instantiation of the class to the factory, and
      instantiating the class as a public, non-global class.

5. The one or more storage mediums of claim 4, wherein the base package and each of the one or more extension packages including a separate namespace.

6. The one or more storage mediums of claim 5, wherein the class may be instantiated within any of the base package or the one or more extension packages.

7. The one or more storage mediums of claim 6, wherein the class is instantiated within a first extension package of the one or more extension packages, and further including executable computer program instructions that, when executed by the one or more processors, cause the one or more processors to perform operations comprising:
   providing the delegated factory to the first extension package for instantiation of the class in the first extension package.

8. A method comprising:
   performing processing in a managed package containing one or more software components, wherein the managed package is a base package or an extension package of one or more extension packages of the base package, the base package and each of the one or more extension packages including a separate namespace;
   processing a call to a namespace utility for a class in the managed package, wherein the namespace utility is defined within the base package and each of the one or more extension packages; and
   in response to the call to the namespace utility:
      identifying a namespace for the class, wherein identifying the namespace for the class comprises obtaining a full name for the class, the full name for the class including a full qualified path, and parsing the full qualified path to identify the namespace for the class, and
      returning the identified namespace.

9. The method of claim 8, wherein the class may be located within any of the base package or the one or more extension packages.

10. The method of claim 8, further comprising:
    providing one or more URL (Uniform Resource Locator) references across package boundaries;
    providing references to fields of an object using a dynamic reference to the namespace; and
    creating test data that include field names that require namespace references.

11. A method comprising:
    performing processing in a managed package containing one or more software components, wherein the managed package is a base package or an extension package of one or more extension packages of the base package, and a class instantiation utility is defined within the base package and each of the one or more extension packages;

receiving a request from outside the managed package for instantiation of a class, the request including the class instantiation utility and a factory for generation of the class; and in response to the request:
delegating instantiation of the class to the factory, and
instantiating the class as a public, non-global class.

12. The method of claim 11, wherein the base package and each of the one or more extension packages including a separate namespace.

13. The method of claim 12, wherein the class may be instantiated within any of the base package or the one or more extension packages.

14. The method of claim 13, wherein the class is instantiated within a first extension package of the one or more extension packages, and further comprising:
providing the delegated factory to the first extension package for instantiation of the class in the first extension package.

* * * * *